(12) United States Patent
Dayal et al.

(10) Patent No.: US 11,858,356 B2
(45) Date of Patent: Jan. 2, 2024

(54) SYSTEM AND METHOD FOR MANAGING ENERGY CONSUMPTION ACROSS ELECTRIC VEHICLE FLEETS WITH TELEMATIC DEVICES IN A COMPUTING ENVIRONMENT

(71) Applicant: Electriphi Inc, San Francisco, CA (US)

(72) Inventors: Sanjay Dayal, San Francisco, CA (US); Muffaddal Ghadiali, San Francisco, CA (US)

(73) Assignee: Electriphi Inc, San Francisco, CA (US)

( * ) Notice: Subject to any disclaimer, the term of this patent is extended or adjusted under 35 U.S.C. 154(b) by 430 days.

(21) Appl. No.: 17/321,559

(22) Filed: May 17, 2021

(65) Prior Publication Data

US 2022/0363140 A1  Nov. 17, 2022

(51) Int. Cl.

| | |
|---|---|
| *B60L 15/20* | (2006.01) |
| *G05B 13/02* | (2006.01) |
| *G05B 13/04* | (2006.01) |
| *G07C 5/00* | (2006.01) |
| *G06N 20/00* | (2019.01) |
| *G01C 21/34* | (2006.01) |
| *H04L 67/12* | (2022.01) |
| *H04L 67/02* | (2022.01) |

(52) U.S. Cl.
CPC ...... *B60L 15/2045* (2013.01); *G01C 21/3469* (2013.01); *G05B 13/0265* (2013.01); *G05B 13/04* (2013.01); *G06N 20/00* (2019.01); *G07C 5/008* (2013.01); *B60L 2240/68* (2013.01); *H04L 67/02* (2013.01); *H04L 67/12* (2013.01)

(58) Field of Classification Search
CPC .. B60L 15/20; B60L 15/2045; B60L 2240/68; G06N 20/00; G01C 21/3469; G05B 13/0265; G05B 13/04; G07C 5/008; H04L 67/02; H04L 67/12
USPC ...................................................... 701/29.2
See application file for complete search history.

(56) References Cited

U.S. PATENT DOCUMENTS

| | | | | |
|---|---|---|---|---|
| 9,964,415 | B2* | 5/2018 | Ricci ................. | G01C 21/3673 |
| 9,994,118 | B2* | 6/2018 | Williams ............... | B60L 58/12 |
| 10,543,754 | B2* | 1/2020 | Jang ....................... | H02J 3/322 |
| 10,685,508 | B2* | 6/2020 | Sainaney ............... | G07C 5/008 |
| 10,893,144 | B2* | 1/2021 | Lee ....................... | H04W 60/06 |

(Continued)

FOREIGN PATENT DOCUMENTS

JP        2018206438 A     12/2018

*Primary Examiner* — Andrew Joseph Rudy
(74) *Attorney, Agent, or Firm* — Jason C. Cameron

(57) ABSTRACT

A system and method for managing energy consumption across a fleet of telematic devices in a computing environment. The method includes receiving real time vehicle operation data from a fleet of telematic devices. The method further includes processing the received real time vehicle operation data using one or more artificial intelligence device integration models. Further, the method includes generating artificial intelligence-based energy management models for the fleet of telematic devices based on the real time vehicle operation data. Additionally, the method includes generating one or more energy management decisions for the fleet of telematic devices based on the generated one or more artificial intelligence-based energy management models. The method further includes managing the generated one or more energy management decisions for the fleet of telematic devices using a web application.

20 Claims, 5 Drawing Sheets

(56) References Cited

U.S. PATENT DOCUMENTS

| | | | |
|---|---|---|---|
| 11,242,064 B1* | 2/2022 | Ferguson | G08G 1/0129 |
| 11,734,773 B2* | 8/2023 | Sworski | H04W 4/38 |
| | | | 455/456.3 |
| 2014/0203077 A1 | 7/2014 | Gadh et al. | |

* cited by examiner

Energy decision management Subsystem 218

- Dashboard view 302
- Vehicle list view 304
- Schedule view 306
- Charging view 308
- Charging ports view 310
- Routes view 312
- Users view 314
- Services view 316
- Utility rates view 318
- Reports view 320
- Analytics view 322
- System Integration view 324

FIG. 3

SYSTEM AND METHOD FOR MANAGING ENERGY CONSUMPTION ACROSS ELECTRIC VEHICLE FLEETS WITH TELEMATIC DEVICES IN A COMPUTING ENVIRONMENT

FIELD OF INVENTION

Embodiments of the present disclosure relate to energy management systems and more particularly, relates to a system and a method for managing energy consumption across a fleet of electric vehicles with telematic devices in a computing environment.

BACKGROUND

Electric Vehicle (EV) adoption continues to increase in public and commercial fleet vehicle sectors. The EVs are usually deployed with one or more telematic devices for tracking and monitoring the EVs. As these EV fleets start to deploy at scale, the focus for innovation shifts to energy management, optimizing charging infrastructure, and managing peak loads on a power grid connected to these EV fleets. Such energy management, charging infrastructure, and managing peak loads usually are achieved by introducing facility-wide smart charging management (SCM) systems that integrate with 1) the EV fleets at an operational level and 2) a local energy utility including dispatch capability to optimize the loads (while considering distributed energy resources). Existing SCM systems for commercial EV fleets employ algorithms that take parameters such as variable energy rates, route characteristics, duty cycles, charging infrastructure, and environmental conditions such as weather to optimize fleet charging. However, the lack of accessible daily operational data, particularly battery status and route topology data, limits the ability of the existing SCM algorithms to make sophisticated energy management decisions that can adapt to real-time variability which is inherent in a typical EV fleet operation. Conventionally, integration of telematics data of the EV fleets with the existing SCM systems can take months and is error prone if using a manual programmatic approach.

Hence, there is a need for an efficient and seamless system and method for managing energy consumption across a fleet of telematic devices in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a device for managing energy consumption across a fleet of telematic devices in a computing environment is disclosed. The device includes one or more hardware processors and a memory coupled to the one or more hardware processors. The memory includes a plurality of subsystems in the form of programmable instructions executable by the one or more hardware processors. The plurality of subsystems includes an operation data receiver subsystem configured for receiving real time vehicle operation data from a fleet of one or more telematic devices via a communication network. The plurality of subsystems further includes an operation data processing subsystem configured for processing the received real time vehicle operation data using one or more artificial intelligence device integration models. Also, the plurality of subsystems further includes an energy management model generation subsystem configured for generating one or more artificial intelligence-based energy management models for the fleet of the one or more telematic devices based on the processed real time vehicle operation data. Also, the plurality of subsystems includes an energy management decision generation subsystem configured for generating one or more energy management decisions for the fleet of the one or more telematic devices based on the generated one or more artificial intelligence-based energy management models. Also, the plurality of subsystems includes an energy decision management subsystem configured for managing the generated one or more energy management decisions for the fleet of the one or more telematic devices using a web application.

In accordance with another embodiment of the present disclosure, a method for managing energy consumption across a fleet of telematic devices in a computing environment is disclosed. The method includes receiving a real time vehicle operation data from a fleet of one or more telematic devices via a communication network. The method further includes processing the received real time vehicle operation data using one or more artificial intelligence device integration models. Further, the method includes generating one or more artificial intelligence-based energy management models for the fleet of the one or more telematic devices based on the processed real time vehicle operation data. Also, the method includes generating one or more energy management decisions for the fleet of the one or more telematic devices based on the generated one or more artificial intelligence-based energy management models. Furthermore, the method includes managing the generated one or more energy management decisions for the fleet of the one or more telematic devices using a web application.

Embodiments of the present disclosure also provide a computing environment for managing energy consumption across a fleet of telematic devices. The computing environment comprises a fleet of one or more telematic devices communicatively coupled to a computing system via a communication network. The computing environment also comprises the computing system comprising a web application configured for managing energy consumption across the fleet of the one or more telematic devices and configured to perform the method as described above.

Embodiment of the present disclosure also provides a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 3 is a block diagram illustrating various components of an energy decision management subsystem such as those shown in FIG. 2, in accordance with an embodiment of the present disclosure;

Figure 1:
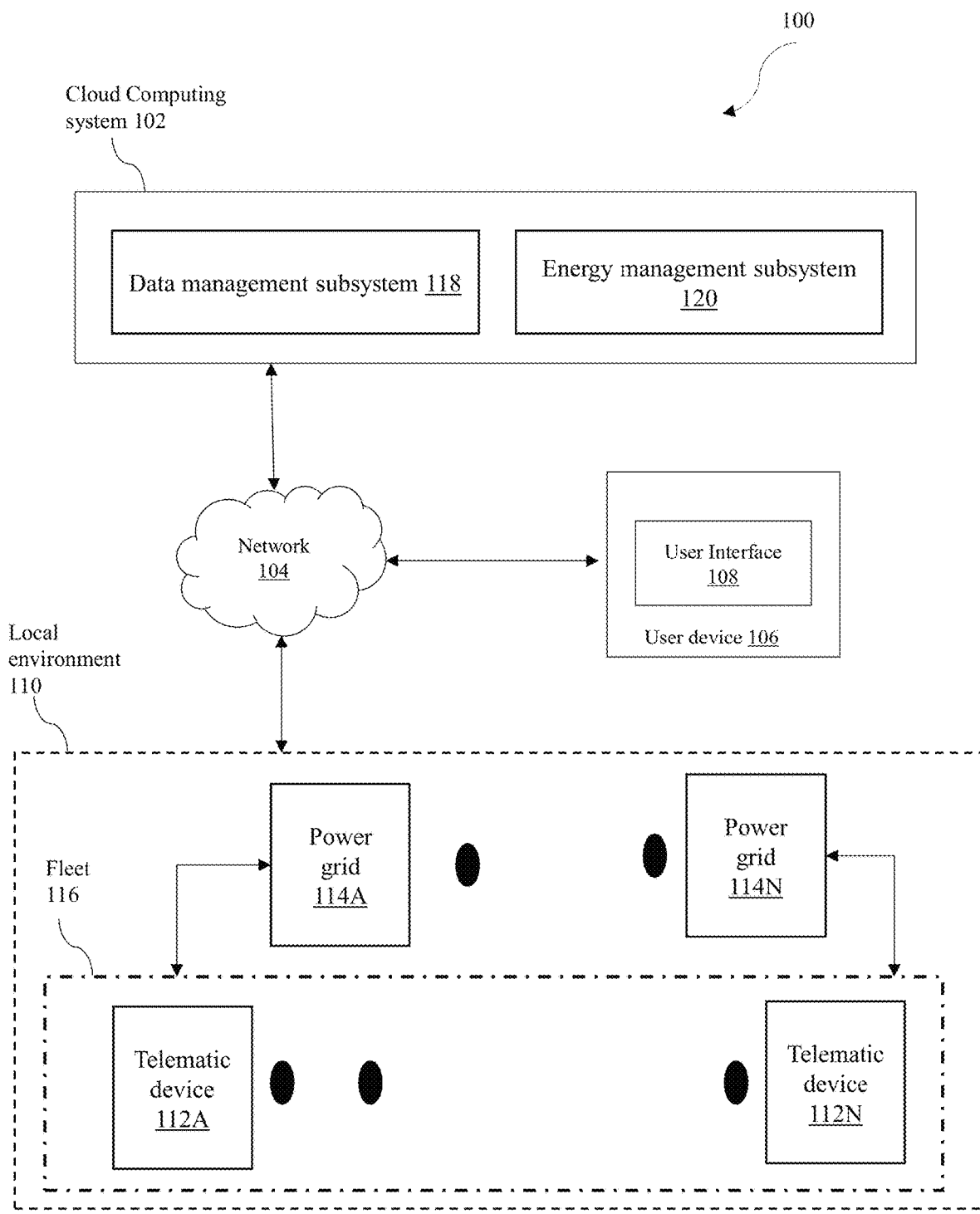
FIG. 1 is a block diagram illustrating an exemplary cloud computing environment for managing energy consumption across a fleet of telematic devices in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or subsystems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

Throughout this document, the terms browser and browser application may be used interchangeably to mean the same thing. In some aspects, the terms web application and web app may be used interchangeably to refer to an application, including metadata, that is installed in a browser application. In some aspects, the terms web application and web app may be used interchangeably to refer to a website and/or application to which access is provided over a network (e.g., the Internet) under a specific profile (e.g., a website that provides email service to a user under a specific profile). The terms extension application, web extension, web extension application, extension app and extension may be used interchangeably to refer to a bundle of files that are installed in the browser application to add functionality to the browser application. In some aspects, the term application, when used by itself without modifiers, may be used to refer to, but is not limited to, a web application and/or an extension application that is installed or is to be installed in the browser application.

Embodiments of the present disclosure disclose a system and method for managing energy consumption across a fleet of telematic devices. The present system leverage value of Internet of Things (IoT) data for smart charging management. The present system develops a telematics data management platform that automates data capturing, normalizing, and storing at scale for any telematics device type and any vehicle. Further, the present system develop algorithms to integrate real-time telematics and vehicle battery management system (BMS) data with the charging optimization algorithm and coordinate seamlessly across a power grid and vehicle fleets. Further, the present system automates telematics data integration through use of machine learning algorithms. This leverages automating feature engineering. The present system provides methods for data gap filling, normalization, and efficient data storage such that the SCM system can make energy management recommendations that incorporate telematics data, route information, environmental conditions, real time traffic information and driving behaviours. The present system includes development of an application programming interface (API)-driven microservice centric architecture.

In order to handle this variety, velocity and volume of data, the present system creates a metadata-based virtual vehicle modelling environment such that business users have the ability to map incoming data to vehicles and sensors for consolidation into a real-time data lake. This vehicle modelling environment is a distinct innovation, as a data ingestion and normalization algorithm reduces the need to programmatically build integration for each new vehicle. The significant impact to the business users is that it reduces time to market from months down to days for onboarding new vehicles and telematics platforms.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 is a block diagram illustrating an exemplary cloud computing environment 100 for managing energy consumption across a fleet 116 of telematic devices 112A-N in accordance with an embodiment of the present disclosure. According to FIG. 1, the cloud computing environment 100 comprises a cloud computing system 102 which is capable of delivering cloud applications such as web applications to a user device 106. Throughout the specification the term 'cloud computing system' may also be referred as 'system' and the 'computing system'. The cloud computing system 102 is connected to the user device 106 via a network 104 (e.g., Internet). The cloud computing system 102 is also connected to a local environment 110 via the network 104. The local environment 110 may be an environment comprising power grids 114A-N and a fleet 116 of one or more telematic devices 112A-N deployed. The local environment 110 may be geographically distributed. The local environment 100 may further comprise additional power components or other components known in the art and hence not shown.

The one or more telematic devices 112A-N may be deployed onto EVs such as motor vehicles or any other assets. The one or more telematic devices 112A-N may correspond to different vendors, where the vendors are referred to as various providers of telematics devices and telematics data. For example, the one of the one or more telematic devices 112A-N may be from Geotab, the other may be from Samsara, the other from Verizon connect and so on. Hence, each of the one or more telematic devices 112A-N may have different device compatibility and different device configurations. Due to these varied device types and configurations, seamlessly integrating such telematic devices were a challenge in conventional system. This has now been overcome using the cloud computing system 102 capable of seamless integrating such varied types of telematic devices onto the cloud network efficiently. The one or more telematic devices 112A-N are configured for transmitting the vehicle operation data periodically to the cloud computing system 102 via the network 104. The one or more EVs may be deployed with one or more IoT-enabled devices for capturing real time operation data of the vehicles and transmitting the captured real time data to the cloud computing system 102. The one or more telematic devices 112A-N also transmit the captured operation data to one or more power grids 114A-N deployed within the local environment 110. The fleet 116 of the one or more telematic devices 112A-N thus comprises a variety of telematic devices from the different vendors and may be geographically distributed. In case, a user of the user device 106 wishes to obtain and manage a full view of the fleet 161 of the one or more telematic devices 112A-N, then the cloud computing system 102 provides an overall overview of such fleet 116 of the one or more telematic devices 112A-N.

The cloud computing system 102 may host a platform or web application for managing energy consumption across the fleet 116 of the one or more telematic devices 112A-N. The cloud computing system 102 comprises a data management subsystem 118 and an energy management subsystem 120. The data management subsystem 118 is configured to obtain the operation data of the vehicles from the one or more telematic devices 112A-N and process such obtained operation data. The energy management subsystem 120 is configured to build energy management models, generate energy model management decisions and manage the generated energy management decisions for the overall local environment 110. A detailed view of the cloud computing system 102 is provided in FIG. 2.

Although, FIG. 1 illustrates the cloud computing system 102 connected to one user device 106 and one local environment 110, one skilled in the art can envision that the cloud computing system 102 can be connected to several user devices and several local environments located at different locations via the network 104.

The user devices 106 can be a laptop computer, desktop computer, tablet computer, smartphone, wearable device, smart watch and the like. The user device 106 can access web applications via a local web browser to manage the energy management decisions of the fleet 116 of the one or more telematic devices 112A-N. Each of the user devices 106 are provided with a user account based on type of the user. For example, the type of the user may be a business user or an end customer, telematic device provider or a vendor, an administrator, and the like. Each user information such as user credentials, user type, user privileges are stored within the cloud computing system 102. Each user is given access to a cloud platform based on successful authentication. Each user is associated with roles and responsibilities.

The web application 112 may be a normal website that includes extra metadata that is installed as part of the browser application. In an embodiment, the web applications 112 may be deployed on the cloud computing system 102 or on any external enterprise data centre.

The cloud computing system 102 includes a cloud interface, cloud hardware and OS, a cloud computing platform, and a database. The cloud interface enables communication between the cloud computing platform and the user device 106. Also, the cloud interface enables communication between the cloud computing platform and the one or more telematic devices 112A-N. The cloud hardware and OS may include one or more servers on which an operating system is installed and including one or more processing units, one or more storage devices for storing data, and other peripherals required for providing cloud computing functionality. The cloud computing platform is a platform which implements functionalities such as data storage, data analysis, data processing, data communication on the cloud hardware and OS via APIs and algorithms and delivers the aforementioned cloud services. The cloud computing platform may include a combination of dedicated hardware and software built on top of the cloud hardware and OS. As used herein, "cloud computing environment" refers to a processing environment comprising configurable computing physical and logical assets, for example, networks, servers, storage, applications, services, etc., and data distributed over the cloud platform. The cloud computing environment 100 provides on-demand network access to a shared pool of the configurable computing physical and logical assets. The server may include one or more servers on which the OS is installed. The servers may comprise one or more processors, one or more storage devices, such as, memory units, for storing data and machine-readable instructions for example, applications and APIs, and other peripherals required for providing cloud computing functionality.

Those of ordinary skill in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a cloud computing system 102 as is unique to the present disclosure or necessary for an understanding of the present disclosure is depicted and described. The remainder of the construction and operation of the cloud computing system 102 may conform to any of the various current implementations and practices known in the art.

Figure 2:
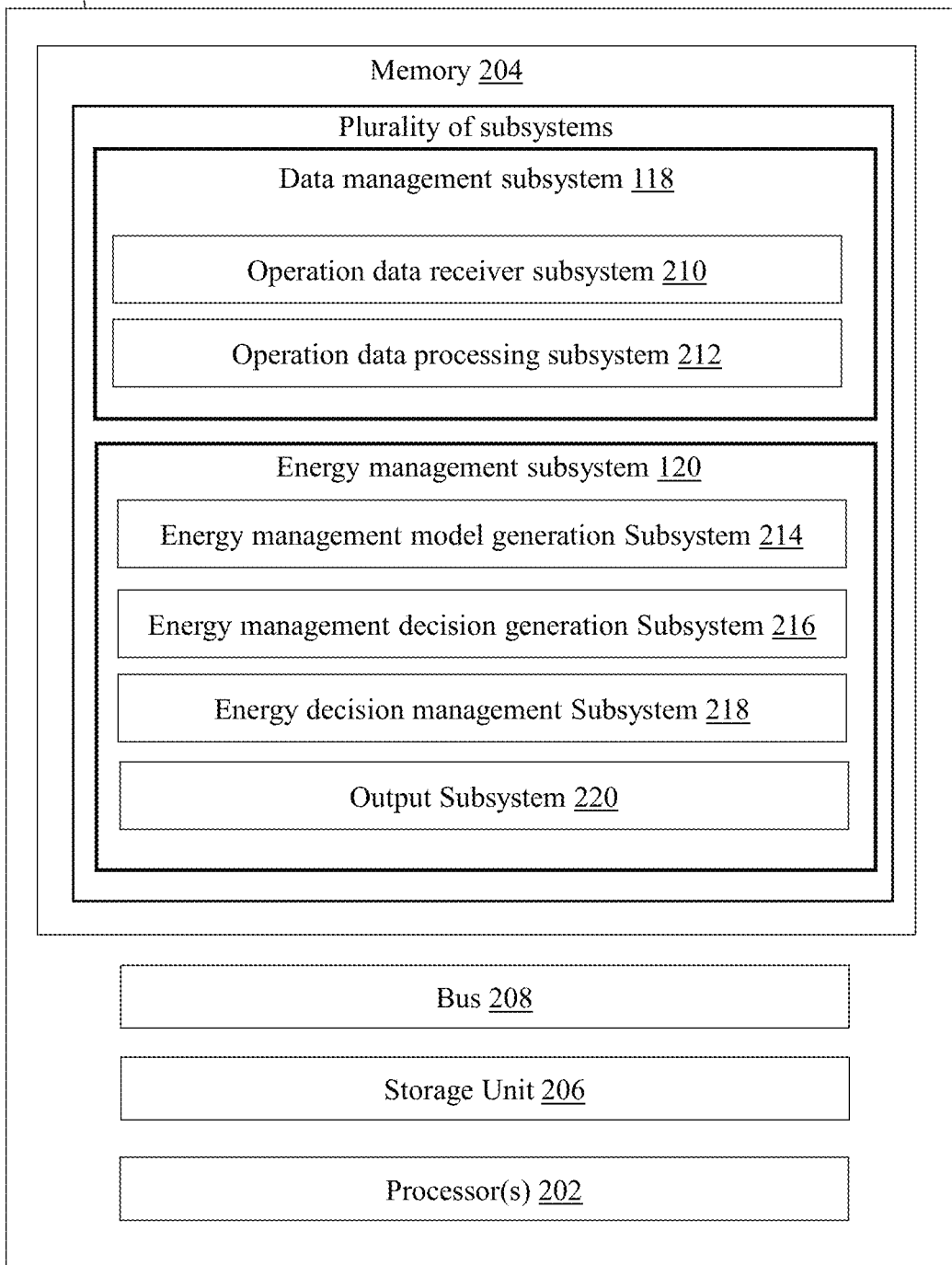
FIG. 2 is a block diagram illustrating an exemplary cloud computing system, such as those shown in FIG. 1, capable of managing energy consumption across a fleet of telematic devices in accordance with an embodiment of the present disclosure.

FIG. 2 is a block diagram illustrating an exemplary cloud computing system 102, such as those shown in FIG. 1, capable of managing energy consumption across a fleet 116 of telematic devices 112A-N in accordance with an embodiment of the present disclosure. In FIG. 2, the cloud computing system 102 comprises a processor 202, a memory 204, and a database 206. The processor 202, the memory 204 and the database 206 are communicatively coupled through a system bus 208 or any similar mechanism. The memory 204 comprises a plurality of subsystems in the form of programmable instructions executable by the one or more processors 202. The plurality of subsystems further includes a data management subsystem 118 and an energy management subsystem 120 such as those shown in FIG. 1. The data management subsystem 118 comprises operation data receiver subsystem 210 and operation data processing subsystem 212. The energy management subsystem 120 further comprises energy management model generation subsystem 214, energy management decision generation subsystem 216, energy decision management subsystem 218 and an output subsystem 220.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like. The computing system 102 may be a cloud computing system or a remote server.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes a plurality of subsystems stored in the form of machine-readable instructions on any of the above-mentioned storage media and may be in communication with and executed by the processor(s) 202.

The operation data receiver subsystem 210 is configured for receiving real time vehicle operation data from a fleet 116 of one or more telematic devices 112A-N via a communication network 104. The real time vehicle operation data comprises at least one of a set of parameters that includes, but is not limited to vehicle speed, location, outside temperature, battery state of charge (SoC), battery temperature, other battery characteristics, odometer readings, vehicle diagnostics, accelerometer data, and the like. The real time vehicle operation data may be received periodically or at time intervals as defined. The real time operation data received from one of the one or more telematic devices 112A-N may be in a different format from that received from another telematic devices 112A-N. The data format depends upon the type of fleet 116 and type of the vehicle. The operation data receiver subsystem 210 is further capable of push and pull capabilities. The operation data receiver subsystem 210 is scalable to arbitrary number of vehicles and fleets. The operation data receiver subsystem 210 also has the ability to stream real-time data with in-stream analytics e.g., hard vehicle braking, detection of insufficient charge (SoC), or available range to reach a given destination.

The operation data processing subsystem 212 is configured for processing the received real time vehicle operation data using one or more artificial intelligence device integration models. The one or more artificial intelligence device integrations models may use a canonical data model e.g., to predict what vehicle is connected to which charger based on the predictive integration models. In processing the received real time vehicle operation data using the one or more artificial intelligence device integration models, the operation data processing subsystem 212 is configured for aggregating the received real time vehicle operation data received from the fleet 116 of the one or more telematic devices 112A-N. This is achieved using statistical and machine learning techniques based on the training data received from the vehicle telematic subsystem. Further, the operation data processing subsystem 212 is configured for extracting one or more vehicle operation parameters from the received real time vehicle operation data. The one or more vehicle operation parameters comprises variable energy rates, route characteristics, duty cycles, charging infrastructure, vehicle data to include battery SoC, battery temperature, other battery characteristics, odometer, vehicle diagnostics, accelerometer data, environmental conditions and the like. Further, the operation data processing subsystem 212 is configured for mapping the extracted one or more vehicle operation parameters with a prestored set of one or more vehicle operation parameters based on type of the one or more telematic devices. The type of the one or more telematic devices may be decided based on vendor or device configuration or device application, such as utility, delivery, mobility and the like. For example, vehicle speed parameter is mapped to a prestored vehicle speed threshold value, inferring for example fuel consumed by the vehicle for certain ranges of speeds covered by the vehicle. The prestored set of one or more vehicle operation parameters may be stored in a canonical data model. Further, the operation data processing subsystem 212 is configured for transforming the mapped one or more vehicle operation parameters from a source device data format to a standard device data format. The standard device data format is predefined and stored in the cloud computing system 102. Each of the real time vehicle data corresponds to a source format depending on type of the vehicle deploying the one or more telematic devices 112A-N. In order to process such real time vehicle data, the cloud computing system 102 first converts the real time vehicle data into standard format. According to some embodiments, the standard format is a standardized schema normalized for encoding, sampling rate, and interpolation and extrapolation based on the quality and quantity of input data. These parameters allows the seamless integration and processing of the device data by the consuming algorithms.

This capability of transformation into standard format enables creation of a single point of integration between a canonical data model and a vendor data streams, through the creation of a hub and spoke model instead of point-to-point customized integration (which is used conventionally). Further, the operation data processing subsystem 212 is configured for generating the one or more artificial intelligence device integration models for the fleet 116 of the one or more telematic devices 112A-N based on the transformed one or more vehicle operation parameters. The one or more artificial intelligence device integration model represents dynamic relationship between the transformed one or more vehicle operation parameters and the fleet 116 of the one or more telematic devices 112A-N based on the type of the one or more telematic devices. The type of the one more telematic devices may be Geotab devices, Samsara devices, Verizon devices, and the like. The one or more artificial intelligence device integration models may be, but are not limited to, a neural network model or a classification model. For example, the one or more artificial intelligence device integration model provides an overview of overall type, number, location of telematic devices 112A-N comprised in the fleet 116 in the form of a graph or a table or any other format.

The operation data processing subsystem 212 has in-flight data transformation capabilities and enables end-user calculations and feature-engineering on real-time data.

The energy management model generation subsystem 214 is configured for generating one or more artificial intelligence-based energy management models for the fleet 116 of the one or more telematic devices 112A-N based on the processed real time vehicle operation data. In generating the one or more artificial intelligence-based energy management models for the fleet 116 of the one or more telematic devices 112A-N based on the processed real time vehicle operation data, the energy management model generation subsystem 214 is configured for determining a vehicle route score of the one or more telematic devices 112A-N based on the extracted one or more vehicle operation parameters. The vehicle route score is determined based on elevation, weather and road conditions of the vehicle. Further, the energy management model generation subsystem 214 is configured for determining a fleet score for the fleet 116 of the one or more telematic devices 112A-N based on the extracted one or more vehicle operation parameters. This is achieved by aggregating measures, to include, but are not limited to, the route score, vehicle score, battery score, weather score, driver score, and charging infrastructure score across operational variables at a fleet level. Further, the energy management model generation subsystem 214 is configured for determining a vehicle driving score for the one or more telematic devices 112A-N based on the extracted one or more vehicle operation parameters. This score is determined using driving behaviour of the driver of the vehicle as it relates to local conditions such as topology and weather. Furthermore, the energy management model generation subsystem 214 is configured for determining a vehicle energy consumption rate for the fleet 116 of the one or more telematic devices 112A-N based on the determined vehicle route score, the fleet score and the vehicle driving score. For each specific route, a fleet may have different scores on a specific day based on static and variable operational parameters. These scores are integrated for charging and scheduling optimization recommendations. Furthermore, the energy management model generation subsystem 214 is configured for generating the one or more artificial intelligence-based energy management models for the fleet 116 of the one or more telematic devices 112A-N based on the determined vehicle energy consumption rate. The one or more artificial intelligence-based energy management models, to include regression models, classification models, or unsupervised learning algorithms, indicates the impact of the one or more vehicle operation parameters on the determined vehicle energy consumption rate.

The energy management decision generation subsystem 216 is configured for generating one or more energy management decisions for the fleet 116 of the one or more telematic devices 112A-N based on the generated one or more artificial intelligence-based energy management models. The one or more energy management decisions comprises charge optimization solutions, route optimization solutions, predictive maintenance, driver training, operation incidence management, charger allocation, rerouting, and optimal scheduling predictions. In generating the one or more energy management decisions for the fleet 116 of the one or more telematic devices 112A-N based on the generated one or more artificial intelligence-based energy management models, the energy management decision generation subsystem 216 is configured for predicting one or more energy management parameters for the fleet 116 of the one or more telematic devices 112A-N based on the generated one or more artificial intelligence-based energy management models. The one or more energy management parameters comprises charge optimization recommendations, route optimization recommendation, telematics data, environmental condition data, real time traffic data and driving behavior data, charging infrastructure data, duty cycle data and the like. The prediction may be based on hour, a day, a week or any time interval required by the user.

The energy decision management subsystem 218 is configured for managing the generated one or more energy management decisions for the fleet 116 of the one or more telematic devices 112A-N using a web application. In managing the generated one or more energy management decisions for the fleet 116 of the one or more telematic devices 112A-N using the web application, the energy decision management subsystem 218 is configured for simulating the generated one or more energy management decisions on a virtual simulation environment emulating a physical computing environment. The virtual simulation environment comprises a similar setup as that of the real local environment 110 comprising all components and configurations. The physical computing environment may be the local environment 110. The simulation is performed to validate the one or more energy management decisions. Upon simulation, if the results of simulation are negative, then the energy decision management subsystem 218 updates driver scoring and geofencing values and again performs simulation on these new values. The geofencing value helps in detecting when vehicle is in depot for charging. The geofencing value may also be calculated along with EV route score, driver score, EV fleet score and the like.

Further, the energy decision management subsystem 218 is configured for deploying the one or more energy management decisions on the physical computing environment comprising the fleet 116 of the one or more telematic devices 112A-N upon successful simulation.

Furthermore, in managing the generated one or more energy management decisions for the fleet 116 of the one or more telematic devices 112A-N using the web application, the energy decision management subsystem 218 is configured for generating visualization reports on the generated one or more energy management decisions. The visualization reports may be analytical reports indicating charging and optimization recommendations to the user. Further, the energy decision management subsystem 218 is configured for outputting the generated visualization reports on a user interface 108.

Furthermore, in managing the generated one or more energy management decisions for the fleet 116 of the one or more telematic devices 112A-N using the web application, the energy decision management subsystem 218 is configured for receiving one or more customization inputs on the generated one or more energy management decisions from one or more users. The one or more customization inputs may be change in the number of telematic devices 112A-N, addition, deletion or modification of the telematic devices 112A-N, change to device configuration, or the like. Further, the energy decision management subsystem 218 is configured for updating the generated one or more energy management decisions based on the received one or more customization inputs.

In managing the generated one or more energy management decisions for the fleet 116 of the one or more telematic devices 112A-N using the web application, the energy decision management subsystem 218 is configured for encrypting the generated one or more energy management decisions for the fleet 116 of the one or more telematic devices 112A-N. Further, the energy decision management subsystem 218 is configured for transmitting the encrypted one or more energy management decisions to at least one of the fleet 116 of the one or more telematic devices 112A-N, the one or more telematic devices 112A-N, an external power device, a user device, and a cloud server.

The energy decision management subsystem 218 is configured for tenant-centric management of customer data. The tenants are the one or more telematic devices 112A-N. the customer data corresponds to user data of the user device 106. The energy decision management subsystem 218 is configured for data anonymization. Further, the energy decision management subsystem 218 is configured for data encryption at-rest and in-motion.

In an embodiment, the plurality of subsystems further comprises a registration subsystem configured for registering the fleet 116 of the one or more telematic devices 112A-N based on one or more device configuration information. The registration subsystem is configured for registration of associating device(s) (and their corresponding data) to vehicles/fleets and their charging information.

Further, the plurality of subsystems comprises an output subsystem 220 for displaying and rendering the one or more energy management decisions, visualization reports, analytical data, and the like.

The storage unit 206 stores the information relating to the fleet 116 of the one or more telematic devices 112A-N, the one or more registered users, and other related information. The storage unit 206 is, for example, a structured query language (SQL) data store. The storage unit 206 is configured as cloud-based database implemented in the computing environment 100, where software application are delivered as a service over a cloud platform. The storage unit 206, according to another embodiment of the present disclosure, is a location on a file system directly accessible by the plurality of subsystems. The storage unit 206 is also responsible for caching and regular updating of telematic device metadata.

The storage unit 206 stores operation data of the vehicle with synchronization to the cloud in the absence of internet connectivity. The processed operation data are stored according to canonical data model, agnostic of telematics service providers, with raw data stored in unstructured format for further analytics.

FIG. 3 is a block diagram illustrating various components of an energy decision management subsystem 218 such as those shown in FIG. 2, in accordance with an embodiment of the present disclosure. In FIG. 3, the energy decision management subsystem 218 comprises a dashboard view 302, a vehicle list view 304, a schedule view 306, a charging view 308, a charging ports view 310, a routes view 312, users view 314, services view 316, a utility rate view 318, reports view 320, analytics view 322, and a system integration view 324.

The dashboard view 302 shows the overall status of the charging depot. It shows what vehicle is connected to which charger, and also shows the energy delivered. The dashboard view 302 also shows the overall number and status of system faults and errors, along with the current power being delivered to the vehicles. The vehicle list view 304 shows the vehicle registration and tracking along with the vehicle's battery capacity and efficiency and other vehicle parameters. The schedule view 306 shows data related to the duty cycle and driver allocation of the vehicle for static and dynamic routes to include route length, arrival, and departure times along with other route parameters calculated by the route subsystem. The charging view 308 displays and provides the real-time data on the battery state of the vehicles if they are connected or the last battery state along with the charging session if they are enroute to a destination. The charging port view 310 provides the most updated data about the known charger in the system.

Continuing with FIG. 3, the routes view 312 shows calculated route length, terrain type, traffic, weather, and other parameters that are provided into the scheduling algorithm for optimal energy delivery. The users view 314 shows the authorized users in the system. The users may be depot managers, drivers, technicians, or other authorized personnel. This view also provides personnel phone numbers and email addresses. The services view 316 captures the real-time data of errors and faults that are occurring in the overall charging system and allows for workflow functions to attempt to mitigate the errors. The utility rate view 318 provides the ability to assign the utility rates that are provided by a utility rate database that contains the most updated "time of use" rates and demand charges for electricity. The reports view 320 provides the reporting functionality and various reports on the energy consumption by each vehicle and chargers and can be provided on a daily, weekly, or monthly schedule. The analytics view 322 provides the KPIs for the charge management system and calculates fleet score and uptime, as well as driving and charging characteristics. Finally, the system integration view 324 provides the status of other systems from which data is being collected for charging management optimization.

Figure 4:
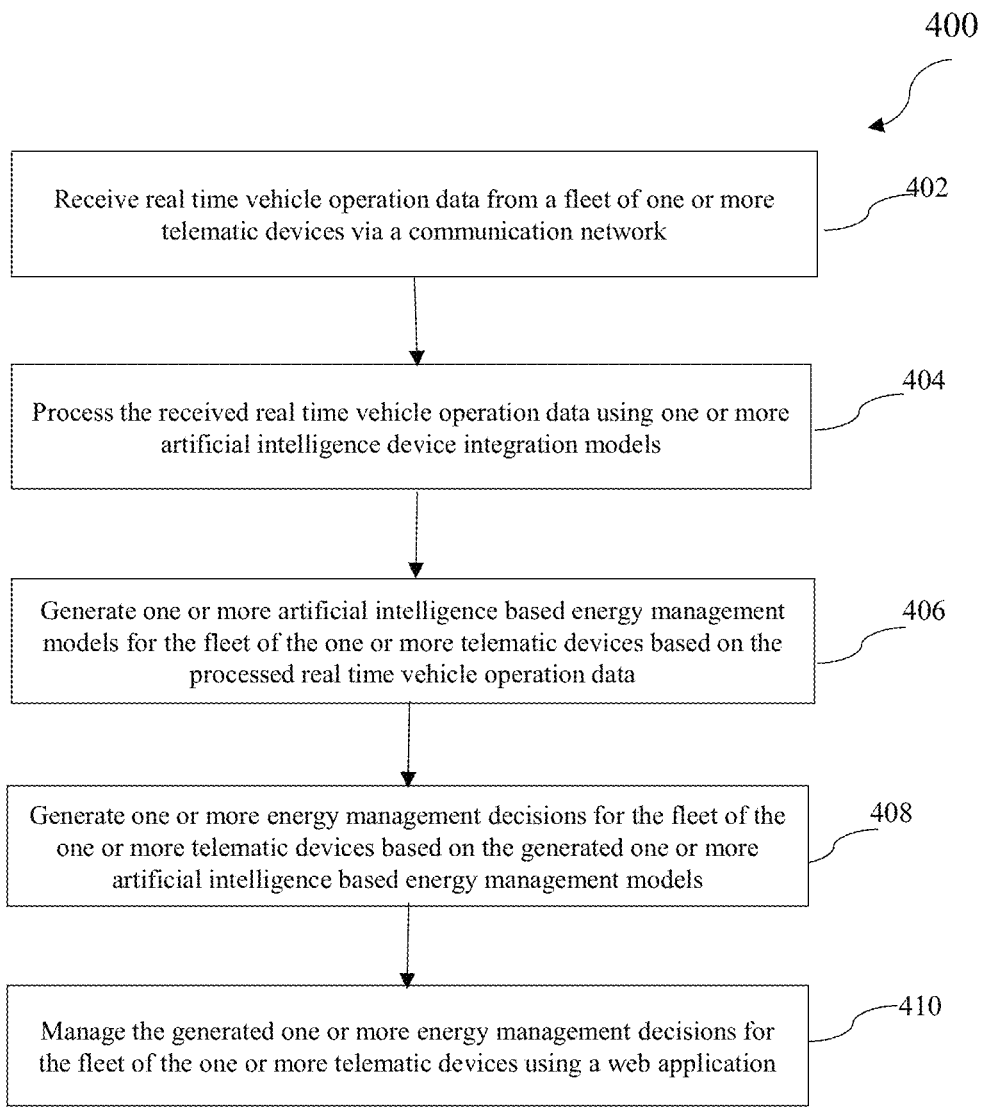
FIG. 4 is a process flow diagram illustrating an exemplary method for managing energy consumption across a fleet of telematic devices in accordance with an embodiment of the present disclosure.

FIG. 4 is a process flow diagram illustrating an exemplary method 400 for managing energy consumption across a fleet 116 of telematic devices 112A-N in accordance with an embodiment of the present disclosure. At step 402, a real time vehicle operation data is received from the fleet 116 of the one or more telematic devices 112A-N via the communication network 104. At step 404, the received real time vehicle operation data is processed using one or more artificial intelligence device integration models. At step 406, one or more artificial intelligence-based energy management models are generated for the fleet 116 of the one or more telematic devices 112A-N based on the processed real time vehicle operation data. At step 408, one or more energy management decisions for the fleet 116 of the one or more telematic devices 112A-N are generated based on the generated one or more artificial intelligence-based energy management models. At step 410, the generated one or more energy management decisions for the fleet 116 of the one or more telematic devices 112A-N are managed using a web application.

In processing the received real time vehicle operation data using the one or more artificial intelligence device integration models, the method 400 comprises aggregating the received real time vehicle operation data received from the fleet 116 of the one or more telematic devices 112A-N. The method 400 comprises extracting one or more vehicle operation parameters from the received real time vehicle operation data. The method 400 further comprises mapping the extracted one or more vehicle operation parameters with a prestored set of one or more vehicle operation parameters based on type of the one or more telematic devices 112A-N. Also, the method 400 comprises transforming the mapped one or more vehicle operation parameters from a source device data format to a standard device data format. Also, the method 400 further comprises generating the one or more artificial intelligence device integration models for the fleet 116 of the one or more telematic devices 112A-N based on the transformed one or more vehicle operation parameters. The one or more artificial intelligence device integration model represents dynamic relationship between the transformed one or more vehicle operation parameters and the fleet 116 of the one or more telematic devices 112A-N based on the type of the one or more telematic devices 112A-N.

In generating the one or more artificial intelligence-based energy management models for the fleet 116 of the one or more telematic devices 112A-N based on the processed real time vehicle operation data, the method 400 comprises determining a vehicle route score of the one or more telematic devices 112A-N based on the extracted one or more vehicle operation parameters. The method 400 further comprises determining a fleet score for the fleet 116 of the one or more telematic devices 112A-N based on the extracted one or more vehicle operation parameters. The method 400 further comprises determining a vehicle driving score for the one or more telematic devices 112A-N based on the extracted one or more vehicle operation parameters. The method 400 further comprises determining a vehicle energy consumption rate for the fleet 116 of the one or more telematic devices 112A-N based on the determined vehicle route score, the fleet score and the vehicle driving score. Furthermore, the method 400 comprises generating the one or more artificial intelligence-based energy management models for the fleet 116 of the one or more telematic devices 112A-N based on the determined vehicle energy consumption rate. The one or more artificial intelligence-based energy management models indicates impact of the one or more vehicle operation parameters on the determined vehicle energy consumption rate.

In generating the one or more energy management decisions for the fleet 116 of the one or more telematic devices 112A-N based on the generated one or more artificial intelligence-based energy management models, the method 400 comprises predicting one or more energy management parameters for the fleet 116 of the one or more telematic devices 112A-N based on the generated one or more artificial intelligence-based energy management models. The one or more energy management parameters comprises charge optimization recommendations, route optimization recommendation, telematics data, environmental condition data, real time traffic data and driving behaviour data, charging infrastructure data, and duty cycle data.

In managing the generated one or more energy management decisions for the fleet 116 of the one or more telematic devices 112A-N using the web application, the method 400 comprises simulating the generated one or more energy management decisions on a virtual simulation environment emulating a physical computing environment. The method 400 comprises deploying the one or more energy management decisions on the physical computing environment comprising the fleet 116 of the one or more telematic devices 112A-N upon successful simulation.

In managing the generated one or more energy management decisions for the fleet 116 of the one or more telematic devices 112A-N using the web application, the method 400 comprises generating visualization reports on the generated one or more energy management decisions. Further, the method 400 comprises outputting the generated visualization reports on a user interface 108.

In managing the generated one or more energy management decisions for the fleet 116 of the one or more telematic devices 112A-N using the web application, the method 400 comprises receiving one or more customization inputs on the generated one or more energy management decisions from one or more users. The method 400 comprises updating the generated one or more energy management decisions based on the received one or more customization inputs.

In managing the generated one or more energy management decisions for the fleet 116 of the one or more telematic devices 112A-N using the web application, the method 400 comprises encrypting the generated one or more energy management decisions for the fleet 116 of the one or more telematic devices 112A-N. The method 400 further comprises transmitting the encrypted one or more energy management decisions to at least one of the fleet 116 of the one or more telematic devices 112A-N, the one or more telematic devices 112A-N, an external power device, a user device, and a cloud server. The method 400 further comprises registering the fleet 116 of the one or more telematic devices 112A-N based on one or more device configuration information.

Figure 5:
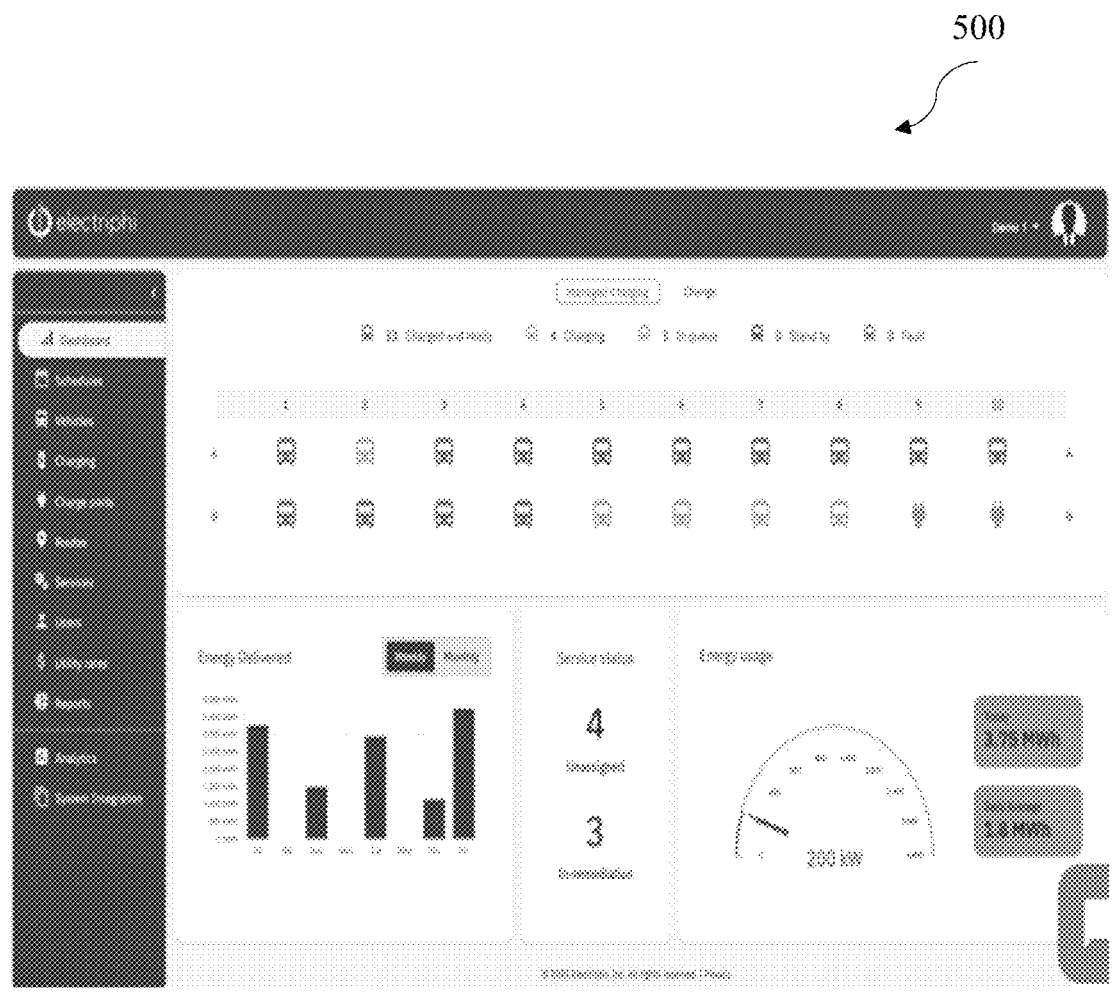
FIG. 5 is an exemplary graphical user interface screen of a web application capable of managing energy consumption across a fleet of telematic devices in accordance with an embodiment of the present disclosure.

FIG. 5 is an exemplary graphical user interface (GUI) screen 500 of a web application capable of managing energy consumption across a fleet 116 of telematic devices 112A-N in accordance with an embodiment of the present disclosure. In this example, the dashboard view 302 is shown. The GUI screen 500 depicts an overview of the cloud platform for managing energy consumption across the fleet 116 of the one or more telematic devices 112A-N. The cloud platform may be a web application hosted on a cloud server, for example. The views of the cloud platform depends on the user profile. The end user manages the dashboard view based on his requirement.

Various embodiments of the present system provide a technical solution to the problem of seamless integration of fleet 116 of one or more telematic devices 112A-N and managing energy consumption thereof. The present system provides ability to generate an anonymized real-world fleet operation data set. The present systems seeks cooperation from fleet managers and telematics suppliers, as they provide real-time onboard device data on the fleet's behalf. Additionally, this enables the present system to integrate fleets rapidly through the use of automation and artificial intelligence techniques, therefore achieving the goal of efficient energy optimization.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for performing context-based application disablement on an electronic device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

The invention claimed is:

1. A device for managing energy consumption across a fleet of telematic devices in a computing environment, the device comprising:
   a hardware processor; and
   a memory coupled to the hardware processor, wherein the memory comprises a set of program instructions in the form of a plurality of subsystems, configured to be executed by the hardware processor, and wherein the plurality of subsystems comprises:
      an operation data receiver subsystem configured for receiving real time vehicle operation data from a fleet of telematic devices via a communications network;
      an operation data processing subsystem configured for processing the received real time vehicle operation data using one or more artificial intelligence device integration models;
      an energy management model generation subsystem configured for generating one or more artificial intelligence-based energy management models for the fleet of telematic devices based on the processed real time vehicle operation data;

an energy management decision generation subsystem configured for generating one or more energy management decisions for the fleet of telematic devices based on the generated one or more artificial intelligence-based energy management models; and an energy decision management subsystem configured for managing the generated one or more energy management decisions for the fleet of telematic devices using a web application.

2. The device of claim 1, further comprising the operation data processing subsystem is configured for:

aggregating the received real time vehicle operation data received from the fleet of telematic devices;

extracting one or more vehicle operation parameters from the received real time vehicle operation data;

mapping the one or more vehicle operation parameters with a prestored set of one or more vehicle operation parameters based on a type of the telematic devices;

transforming the mapped one or more vehicle operation parameters from a source device data format to a standard device data format; and generating the one or more artificial intelligence device integration models for the fleet of telematic devices based on the transformed one or more vehicle operation parameters, wherein the one or more artificial intelligence device integration models represents a dynamic relationship between the transformed one or more vehicle operation parameters and the fleet of telematic devices based on the type of telematic devices.

3. The device of claim 1, wherein in generating the one or more artificial intelligence-based energy management models for the fleet of telematic devices based on the processed real time vehicle operation data, the energy management model generation subsystem is configured for:

determining a vehicle route score of the fleet of telematic devices based on the one or more vehicle operation parameters;

determining a fleet score for the fleet of telematic devices based on the one or more vehicle operation parameters;

determining a vehicle driving score for the fleet of telematic devices based on the one or more vehicle operation parameters;

determining a vehicle energy consumption rate for the fleet of telematic devices based on the at least one of a set comprising vehicle route score, the fleet score, and the vehicle driving score; and generating the one or more artificial intelligence-based energy management models for the fleet of telematic devices based on the vehicle energy consumption rate, wherein the one or more artificial intelligence-based energy management models indicates an impact of the one or more vehicle operation parameters on the vehicle energy consumption rate.

4. The device of claim 1, wherein in generating the one or more energy management decisions for the fleet of telematic devices based on the generated one or more artificial intelligence-based energy management models, the energy management decision generation subsystem is configured for:

predicting one or more energy management parameters for the fleet of telematic devices based on the generated one or more artificial intelligence-based energy management models, wherein the one or more energy management parameters comprises at least one of a set comprising charge optimization recommendations, route optimization recommendations, telematics data, environmental condition data, real time traffic data, driving behavior data, charging infrastructure data, and duty cycle data.

5. The device of claim 1, wherein in managing the generated one or more energy management decisions for the fleet of telematic devices using the web application, the energy decision management subsystem is configured for:

simulating the generated one or more energy management decisions on a virtual simulation environment emulating a physical computing environment; and deploying the one or more energy management decisions on the computing environment comprising the fleet of telematic devices upon a successful simulation.

6. The device of claim 1, wherein in managing the generated one or more energy management decisions for the fleet of telematic devices using the web application, the energy decision management subsystem is configured for:

generating a visualization report on the generated one or more energy management decisions; and outputting the generated visualization report to a user interface.

7. The device of claim 1, wherein in managing the generated one or more energy management decisions for the fleet of telematic devices using the web application, the energy decision management subsystem is configured for:

receiving one or more customization inputs on the one or more energy management decisions from one or more users; and updating the one or more energy management decisions based on the one or more customization inputs.

8. The device of claim 1, wherein in managing the generated one or more energy management decisions for the fleet of telematic devices using the web application, the energy decision management subsystem is configured for:

encrypting the one or more energy management decisions for the fleet of telematic devices; and transmitting the one or more energy management decisions to at least one of a set comprising the fleet oft telematic devices, an external power device, a user device, and a cloud server.

9. The device of claim 1, further comprising a registration subsystem configured for:

registering the fleet of telematic devices based on one or more sets of device configuration information.

10. A method for managing energy consumption across a fleet of telematic devices in a computing environment, the method comprising:

receiving, by a processor, real time vehicle operation data from a fleet of telematic devices via a communications network;

processing, by the processor, the real time vehicle operation data using one or more artificial intelligence device integration models;

generating, by the processor, one or more artificial intelligence-based energy management models for the fleet of t telematic devices based on the real time vehicle operation data;

generating, by the processor, one or more energy management decisions for the fleet of telematic devices based on the one or more artificial intelligence-based energy management models; and managing, by the processor, the one or more energy management decisions for the fleet of telematic devices using a web application.

11. The method of claim 10, wherein processing the real time vehicle operation data using the one or more artificial intelligence device integration models comprises:

aggregating the real time vehicle operation data received from the fleet of telematic devices;
extracting one or more vehicle operation parameters from the real time vehicle operation data;
mapping the extracted one or more vehicle operation parameters with a prestored set of one or more vehicle operation parameters based on a type of the fleet of telematic devices;
transforming the one or more vehicle operation parameters from a source device data format to a standard device data format; and
generating the one or more artificial intelligence device integration models for the fleet of telematic devices based on the transformed one or more vehicle operation parameters, wherein the one or more artificial intelligence device integration models represents a dynamic relationship between the transformed one or more vehicle operation parameters and the fleet of telematic devices based on the type of the fleet of telematic devices.

12. The method of claim 10, wherein generating the one or more artificial intelligence-based energy management models for the fleet of telematic devices based on the processed real time vehicle operation data comprises:
determining a vehicle route score of the fleet of telematic devices is based on the one or more vehicle operation parameters;
determining a fleet score for the fleet of telematic devices based on the one or more vehicle operation parameters;
determining a vehicle driving score for the fleet of telematic devices based on the one or more vehicle operation parameters;
determining a vehicle energy consumption rate for the fleet of telematic devices based on at one of a set comprising the vehicle route score, the fleet score, and the vehicle driving score; and
generating the one or more artificial intelligence-based energy management models for the fleet of telematic devices based on the determined vehicle energy consumption rate, wherein the one or more artificial intelligence-based energy management models indicates an impact of the one or more vehicle operation parameters on the vehicle energy consumption rate.

13. The method of claim 10, wherein generating the one or more energy management decisions for the fleet of telematic devices based on the one or more artificial intelligence-based energy management models comprises:
predicting one or more energy management parameters for the fleet of telematic devices based on the one or more artificial intelligence-based energy management models, wherein the one or more energy management parameters comprises at least of a set comprising charge optimization recommendations, route optimization recommendations, telematics data, environmental condition data, real time traffic data, driving behavior data, charging infrastructure data, and duty cycle data.

14. The method of claim 10, wherein managing the generated one or more energy management decisions for the fleet of telematic devices using the web application comprises:
simulating the one or more energy management decisions on a virtual simulation environment emulating a physical computing environment; and
deploying the one or more energy management decisions on the physical computing environment comprising the fleet of telematic devices upon a successful simulation.

15. The method of claim 10, wherein managing the generated one or more energy management decisions for the fleet of telematic devices using the web application comprises:
generating one or more visualization reports on the one or more energy management decisions; and
outputting the one or more generated visualization reports on a user interface.

16. The method of claim 10, wherein managing the generated one or more energy management decisions for the fleet of telematic devices using the web application comprises:
receiving one or more customization inputs on the one or more energy management decisions from one or more users; and
updating the one or more energy management decisions based on the received one or more customization inputs.

17. The method of claim 10, wherein managing the generated one or more energy management decisions for the fleet of telematic devices using the web application comprises:
encrypting the gone or more energy management decisions for the fleet of telematic devices; and
transmitting the encrypted one or more energy management decisions to at least one of a set comprising the fleet of telematic devices, an external power device, a user device, and a cloud server.

18. The method of claim 10, further comprising:
registering the fleet of telematic devices based on one or more sets of device configuration information.

19. A computing environment for managing energy consumption across a fleet of telematic devices comprising:
the fleet of telematic devices communicatively coupled to a computing system via a communication network; and
the computing system comprising a web application configured for managing energy consumption across the fleet of telematic devices and configured to perform the method steps of:
receiving real time vehicle operation data from the fleet of telematic devices via the communication network;
processing the received real time vehicle operation data using one or more artificial intelligence device integration models;
generating one or more artificial intelligence-based energy management models for the fleet of telematic devices based on the real time vehicle operation data;
generating one or more energy management decisions for the fleet of telematic devices based on the generated one or more artificial intelligence-based energy management models; and
managing the generated one or more energy management decisions for the fleet of telematic devices using a web application.

20. A non-transitory computer-readable storage medium having instructions stored therein that, when executed by a hardware processor, cause the processor to perform the method steps comprising:
receiving real time vehicle operation data from a fleet of telematic devices via a communication network;
processing the real time vehicle operation data using one or more artificial intelligence device integration models;
generating one or more artificial intelligence-based energy management models for the fleet of telematic devices based on the real time vehicle operation data;

generating one or more energy management decisions for the fleet of telematic devices based on the generated one or more artificial intelligence-based energy management models; and managing the generated one or more energy management decisions for the fleet of telematic devices using a web application.

\* \* \* \* \*